US00RE33950E

United States Patent [19]

Kunze

[11] E Patent Number: Re. 33,950

[45] Reissued Date of Patent: Jun. 9, 1992

[54] APPARATUS HAVING AT LEAST TWO CONTROL BARS WITH DIFFERING LATCHING ARRANGEMENTS

[75] Inventor: Norbert Kunze, Ehringshausen, Fed. Rep. of Germany

[73] Assignee: U.S. Philips Corporation, New York, N.Y.

[21] Appl. No.: 597,612

[22] Filed: Oct. 11, 1990

Related U.S. Patent Documents

Reissue of:

[64] Patent No.: 4,827,785
Issued: May 9, 1989
Appl. No.: 922,580
Filed: Oct. 24, 1986

[30] Foreign Application Priority Data

Oct. 24, 1985 [DE] Fed. Rep. of Germany ..... 3537836

[51] Int. Cl.[5] ..... G05G 1/02; G05G 5/08

[52] U.S. Cl. ..... 74/483 PB; 200/5 E; 360/137

[58] Field of Search ..... 74/483 PB; 200/5 E; 360/137

[56] References Cited

U.S. PATENT DOCUMENTS 3,305,187 2/1967 Atsumi ..... 74/483 PB X
3,900,173 8/1975 Ketzer ..... 242/201
4,179,721 12/1979 Nakazono et al. ..... 360/137

*Primary Examiner*—Allan D. Herrmann
*Attorney, Agent, or Firm*—David R. Treacy

[57] ABSTRACT

The invention relates to a magnetic tape apparatus having at least two push buttons (31, 32) which, when their push-button bars (33, 34) are pressed in separately, exercise individual functions on apparatus parts, with it being possible for each of the push-button bars (33, 34), loaded in tension by means of springs (50, 51) in the direction of their initial neutral positions, to be arrested in the pressed-in position, and with it being possible for a spring-loaded blocking member (20) which can be moved by all push-button bars (33, 34) and which interacts with latches on the push-button bars (33, 34) to be adjusted in such a way that, when a push-button bar is pressed in, a push-button bar arrested beforehand is released for withdrawal. In addition, the individual latches (52, 53) of at least two push-button bars (33, 34) with the parts of the blocking member (20) which are allocated to the individual latches (52, 53) have latching arrangements of different design. The different latching arrangements are constructed in such a way that the push-button bars (33, 34) having a different latching arrangement, when they are alternately pushed in, are released by the blocking member (20) for withdrawal. Moreover, it is provided that the blocking member (20), when these push-button bars (33, 34) are pushed in together, likewise releases these two push-button bars for withdrawal.

14 Claims, 3 Drawing Sheets

APPARATUS HAVING AT LEAST TWO CONTROL BARS WITH DIFFERING LATCHING ARRANGEMENTS

Matter enclosed in heavy brackets [ ] appears in the original patent but forms no part of this reissue specification; matter printed in italics indicates the additions made by reissue.

BACKGROUND OF THE INVENTION

The invention relates to a magnetic tape apparatus having at least two push buttons which, when their push-button bars are pressed in separately, exert individual functions on apparatus parts. In such apparatus each of the push-button bars is loaded in tension by means of springs in the direction of their initial neutral positions, and is arrested in the pressed-in position. A spring-loaded blocking member can be moved by all push-button bars, and interacts with latches on the push-button bars to be adjusted in such a way that, when a push-button bar is pressed-in, any push-button bar which was arrested beforehand is released for return to the initial position. The individual latches of at least two push-button bars with blocking member parts allocated to the individual latches have latching arrangements of different design.

A magnetic tape apparatus of this type is [knwon] *known* from German Patent Specification No. 2,233,127 to which U.S. Pat. No. 3,900,173 corresponds. In this apparatus, several push-button bars are provided with latches which engage into recesses of a transversely displaceable slide. The latches, after they have displaced the slide by means of inclined edges on the recesses during the push-in movement, can drop into allocated latching hollows. The push-button bars thus arrested in the pushed-in position can therefore set certain operating functions in the apparatus. When a second push-button bar is pushed in from its neutral position, this push-button bar also pushes the slide aside via its latch. If the first push-button bar, which had been arrested beforehand, is not secured manually in the pushed-in position, the first push-button bar springs out when the second push-button bar is pushed in.

If both push-button bars are pushed in together for another preset function, the latches of both push button bars drop behind the latching edges of the recesses and thus both are locked. It is only possible to unlock these two push-button bars with the aid of a third push-button bar having an inclined edge which displaces the slide to the extent that both arresting latches are freed from the blocking edges. All push-button bars are preloaded in the outward direction by means of springs, so that they always return to their initial position when the latches are released.

With its latch and the associated slide recess, each individual push-button bar forms a separate latching arrangement. Moreover, the two individually lockable push-button bars have latching arrangements of the same design. In the '173 U.S. Patent there is also a further push-button bar with another latching arrangement which is of such a design that it can disengage the latching arrangements of the two first mentioned push-button bars in the same way as the non-locking release push-button bar.

SUMMARY OF THE INVENTION

In a magnetic tape apparatus, it is the object of the invention to operate apparatus functions via push-button bars which, even when pressed in together, can always be unlocked without the use of a special disengaging button.

In an apparatus according to the invention the different latching arrangements are constructed in such a way that the push-button bars having a different latching arrangement, when they are alternately pushed in, are released by the blocking member for return to the neutral position; and that the blocking member, when these push-button bars are pushed in together, likewise releases these two push-button bars for return to the neutral position.

This construction has the advantage that, with the push buttons for the individual functions, when operating the push buttons with only one latching arrangement or when operating the push buttons with both latching arrangements, unlocking is always possible without the aid of a disengaging button specially designed for the disengaging. Thus the disengaging button is dispensed with. This elimination is important in small apparatus, such as, for example, car radio-cassette players, in which there is little space available on the operating side. Moreover, the number of components is reduced. The manufacturing of an apparatus therefore becomes more economical.

By the use of two types of latching arrangements, it becomes possible, with a push-button bar having one type of latching arrangement, to disengage push-button bars having another type of latching arrangement and vice versa. [Itis] *It is* therefore important that push-button bars having two different types of latching arrangements are always available.

According to a preferred embodiment of the invention, with the blocking means for each latch having a blocking edge, running across the push-in direction, and a first sliding edge running at an inclined angle to the push-in direction, a second inclined sliding edge is provided between the blocking edge and the first inclined sliding edge. The first inclined sliding edge, when a push-button bar is pushed in, and the second inclined sliding edge, during withdrawal, unlock at least one other push-button bar. Thus the push-button bars, in both directions of movement, that is both when entering and withdrawing, can execute an unlocking action. When a push button of one type of latching arrangement is pushed in, the latching arrangement of the other type is disengaged via the first inclined sliding edge. If push-button bars of both latching arrangements are pushed in and if both of these are released, both latching arrangement are disengaged via one of the second inclined sliding edges.

According to a further embodiment of the invention, it is provided that the length of the deflection movement of the blocking member, during the longitudinal sliding movement of a latch of a latching arrangement along one of the associated inclined sliding edges, is always greater than the length of the blocking edge across the push-button bar sliding direction of the other latching arrangement. This ensures that, no matter whether a push-button bar is just pushed in or whether it is released after pushing in, a latch runs onto an inclined sliding edge and thus disengages the other latching arrangement or both latching arrangements. Preferably, the first and second sliding edge enclose an obtuse angle with one another. By the formation of an [abtuse] *obtuse* angle, the frictional forces to be overcome when operating the push-button bar are kept low.

In this preferred embodiment of the invention, the latches are designed in such a way that the respective push-in displacement of a push-button bar is approximately the same up to the unlocking of another push-button bar engaged beforehand. The difference in the design of the latches can, for example, consist in their length in the push-in direction or in the attachment of an additional latch. In any case, it can thus be ensured that, for unlocking, all push-button bars having different types of latching arrangements execute the same push-in displacements to disengage. Thus operating is made easier.

In a different embodiment of the invention, with the blocking member being designed as a longitudinally displaceable slide and with a recess in the slide being allocated to each latch, the recesses are formed in such a way that the slide, as a result of one of the push-button bars being pushed in, can be displaced in both directions relative to its neutral position. By this design of the recesses, it becomes possible to have both types of latching arrangements work with a longitudinally displaceable slide.

Preferably, in the first embodiment of the invention, the blocking member is designed as a pivotable catch [with] *which* interacts with the latches of all push button bars and can be pivoted by the latches against spring force. A pivotable blocking catch can be of very compact design, which is of great importance in instruments of small construction.

It is further desirable that the latches extend tangentially to the catch pivot axis, and latches of two different latching arrangements have different tangential extents, with one latch bearing against a blocking edge. Thus more favourable transmission ratios are achieved and there is no complicated recess formation.

In the first embodiment of the invention, preferably the blocking member is advantageously made as a plastic injection moulding, with a flexible plastic arm being integrally provided on it, which plastic arm, when the push-button bars are pushed in, can be pretensioned in flexible manner by inclined edges of the push-button bars, which edges run onto the plastic arm. Such a member design can easily be manufactured, and the spring does not require additional assembly.

The invention is described in greater detail with reference to the exemplary embodiments shown in the drawing.

DESCRIPTION OF THE PREFERRED EMBODIMENTS

Figure 1:
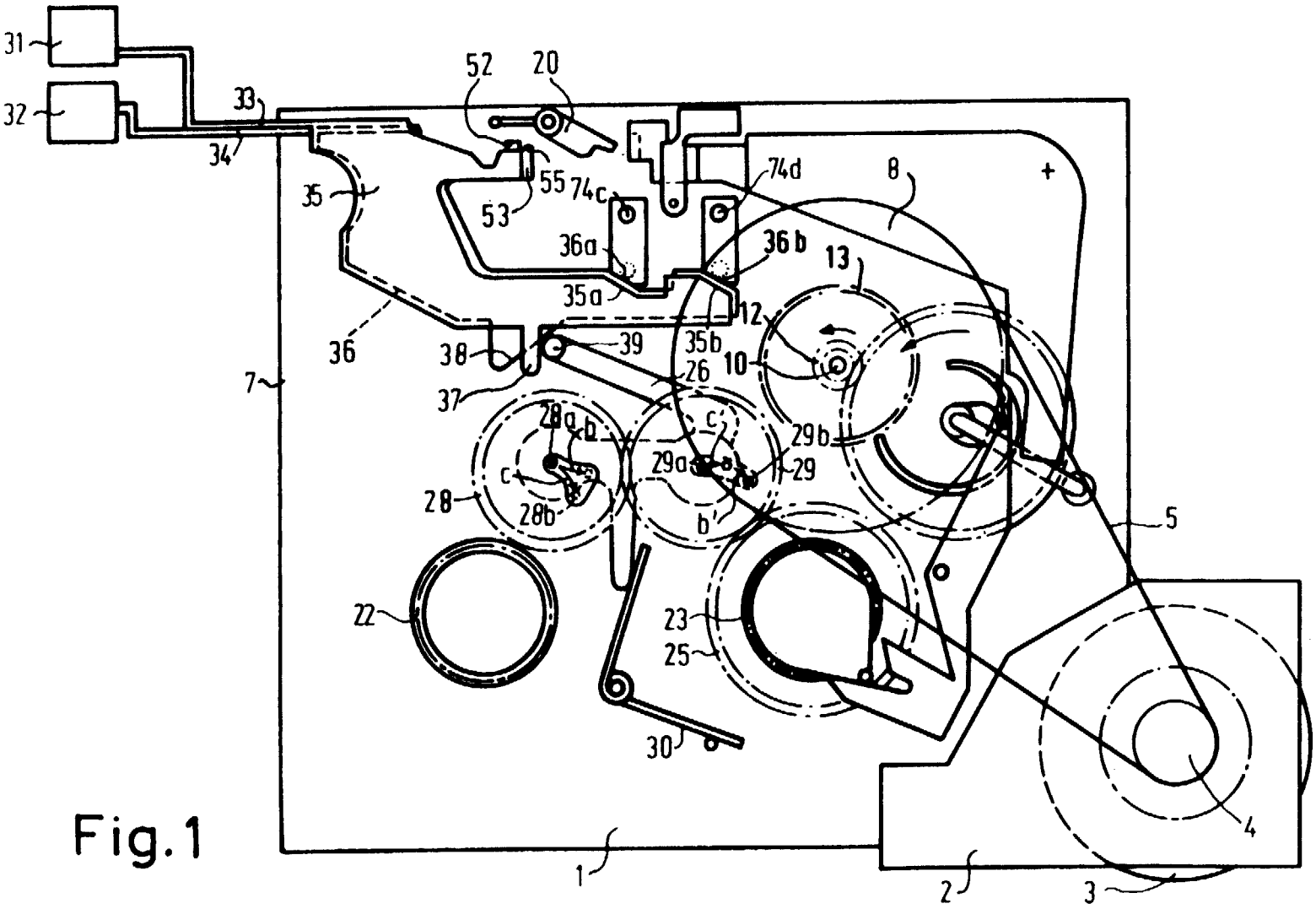
FIG. 1 is a bottom view of a magnetic tape apparatus, to be fitted into a car radio, having two push-buttons in their extended neutral position.

The magnetic tape apparatus shown in FIG. 1 has a frame 1, which, via a support 2, carries a drive motor 3 rotating only in one direction. The drive pulley 4 of the motor 3 drives a round belt 5 which is guided over a flywheel 8. The flywheel 8 is journalled in the frame 1 and is firmly connected to a capstan shaft 10 and a gear 12. A further gear 14 is rotatably arranged on the flywheel 8 co-axially to the gear 12 via a friction coupling.

Moreover, magnetic tape hubs, which are journalled in the frame 1, are firmly connected to fast-wind wheels 22 and 23. A play wheel 25 is connected to one of the magnetic tape hubs via a friction coupling. A member 26, which is [displaceable] *displaceably* mounted in the frame, supports two gears 28 and 29 next to one another. A spring 30 continually presses the member 26 [into] *toward* an initial position shown in FIG. 1.

The member 26 bears two pins 28a and 29a which are displaceable in the frame 1 in a triangular hole 28b and a slot 29b respectively.

Two push buttons 31 and 32 are provided for fast forward and reverse running. These push buttons 31 and 32 are connected to slides 35 and 36 via push-button bars 33 and 34. These slides 35 and 36 act on the member 26. For this purpose, the slide 35 is provided with an extension 37. The slide 36 accordingly has a ramp surface 38. The extension 37 and the ramp surface 38 act on a pin 39 of the member 26. Moreover, the slides 35 and 36 are provided with ramp surfaces 35a and 35b, and 36a and 36b respectively, which can act on pins 74c and 74d respectively of a headplate (not shown). This headplate lies on the other side of the frame 1.

The gear 29 first comes into engagement with the gear 13 when the button 31 is depressed and the extension 37 presses against the pin 39 of the member 26 followed by the pressing in and interlocking of the push-button bar 33 by a blocking member 20. At the same time, the pin 28a executes a movement in the direction of arrow b, and the pin 29a executes a movement in the direction of arrow c'. Upon further movement, the pin 29a travels further in the direction of arrow b' and the gear 29 comes into engagement with the gear 23. The magnetic tape is now rapidly wound with the magnetic tape hub connected to the gear 23. If, on the other hand, the other push-button bar 34 is pressed in and locked with the blocking member 20 in a manner to be described below, the run-on surface 38 acts on the pin 39 of the member 26, as a result of which the pin 28a travels in the direction of arrow c and the pin 29a travels in the direction of arrow c', as a result of which the gear 29 comes into engagement with the gear 13, and the gear 28 comes into engagement with the gear 22. Consequently, the other magnetic tape hub is connected to the gear 22 [is driven] for fast winding.

Figure 3:
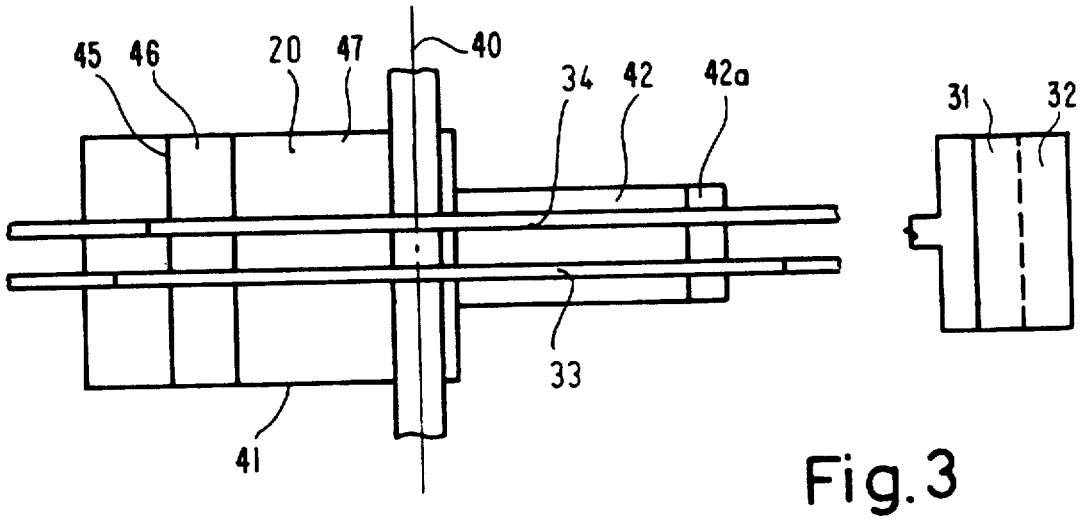
FIG. 3 is a schematic elevation of the construction shown in FIG. 2.
Figure 2:
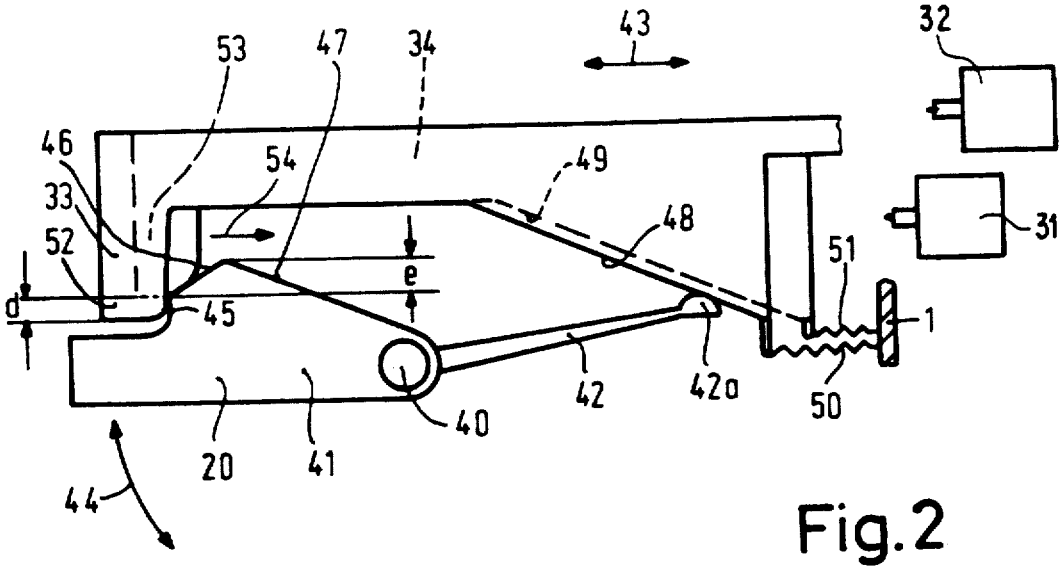
FIG. 2 is an enlarged schematic bottom view of a blocking catch and portions of the push-button bars of the apparatus of FIG. 1.

FIGS. 2 and 3 schematically show the interaction of the push-button bars 33 and 34 with the blocking member 20, with the slides 35 and 36 shown in FIG. 1 being omitted for the sake of simplicity. The blocking member 20 is designed as a catch which can be pivoted about an axis 40. The catch 20 consists of a catch body 41 and a flexible plastic arm 42 injection-moulded onto this catch body. Because the axis 40 of the catch 20 extends perpendicularly to the displacement direction 43 of the push-button bars 33 and 34, the catch body 41 can pivot in the direction of the double arrow 44. A blocking edge 45 is located in the area of the free end of the catch body 41. Adjoining the blocking edge 45 is a second inclined sliding edge 46 which encloses an obtuse angle with a first inclined sliding edge 47 adjoining it. The free end 42a of the plastic arm 42 can interact with inclined surfaces 48 and 49 of the push button bars 33 and 34.

The push-button bars 33 and 34 are loaded in tension in the outward direction by means of spring 50 and 51. The springs 50 and 51 engage on the frame 1. The push-button bars 33 and 34 are provided with latches 52 and 53. The latches 52 and 53 extend tangentially to the catch pivot axis 40 and have a different length d in the direction toward the catch body 41. In this embodiment the length of the latch 52 is greater that the length of the latch 53.

In FIGS. 2 and 3, the push-button bar 33 is pressed in, so that the latch 52 is interlocked behind the blocking edge 45. As a result of the pushing in, the inclined surface 48 of the push-button bar 33 presses against the plastic arm 42, and the catch body 41 is thus spring-loaded in the clockwise direction, as a result of which firm locking is obtained. Moreover, it is shown that the push-button bar 34 is also pressed in at the same time, so that the latch 53 has also moved behind the second sliding edge 46. The latch 53 has thus not been locked, but is pulled back by the spring 51 in the direction of an arrow 54. The catch body 41 thus is pivoted in the counterclockwise direction by movement of the latch 53 along the inclined edge 46, bending the arm 42 and releasing the latch 52. This ensures that, when the two push-button bars 33 and 34 are pushed in together, both push-button bars are unlocked when finger pressure on the push buttons is removed at the same time, and return to the initial neutral position.

In this connection, it is important that latch 52 and the blocking edge 45 on the one hand and the latch 53 and the blocking edge 45 on the other hand form different types of latching arrangements. Both latching arrangements individually make it possible to press in and reliably interlock only one of the push-button bars 33 and 34. In this case, the latching arrangements are constructed such that the push-button bars having a different latching arrangement will latch individually when alternately pressed in, by the blocking member 20. However, the same blocking member 20, when these push-button bars 33 and 34 are pressed in together, likewise releases these two push button bars for return to the neutral position. In this connection, it is important that the latches 52 and 53 extend tangentially to the catch pivot axis 40, and latches of two different latching arrangements have different tangential extents, with the distance d (FIG. 2) being smaller than the length of the possible deflection movement e [or g] of the catch body 41 which can be produced by the latch 53.

As is apparent from FIG. 1, an additional extension 55 is provided on the latch 53. This additional extension ensures that the respective push-in displacement of a push-button bar is always approximately the same up to the unlocking of another push-button bar engaged beforehand.

Figure 4:
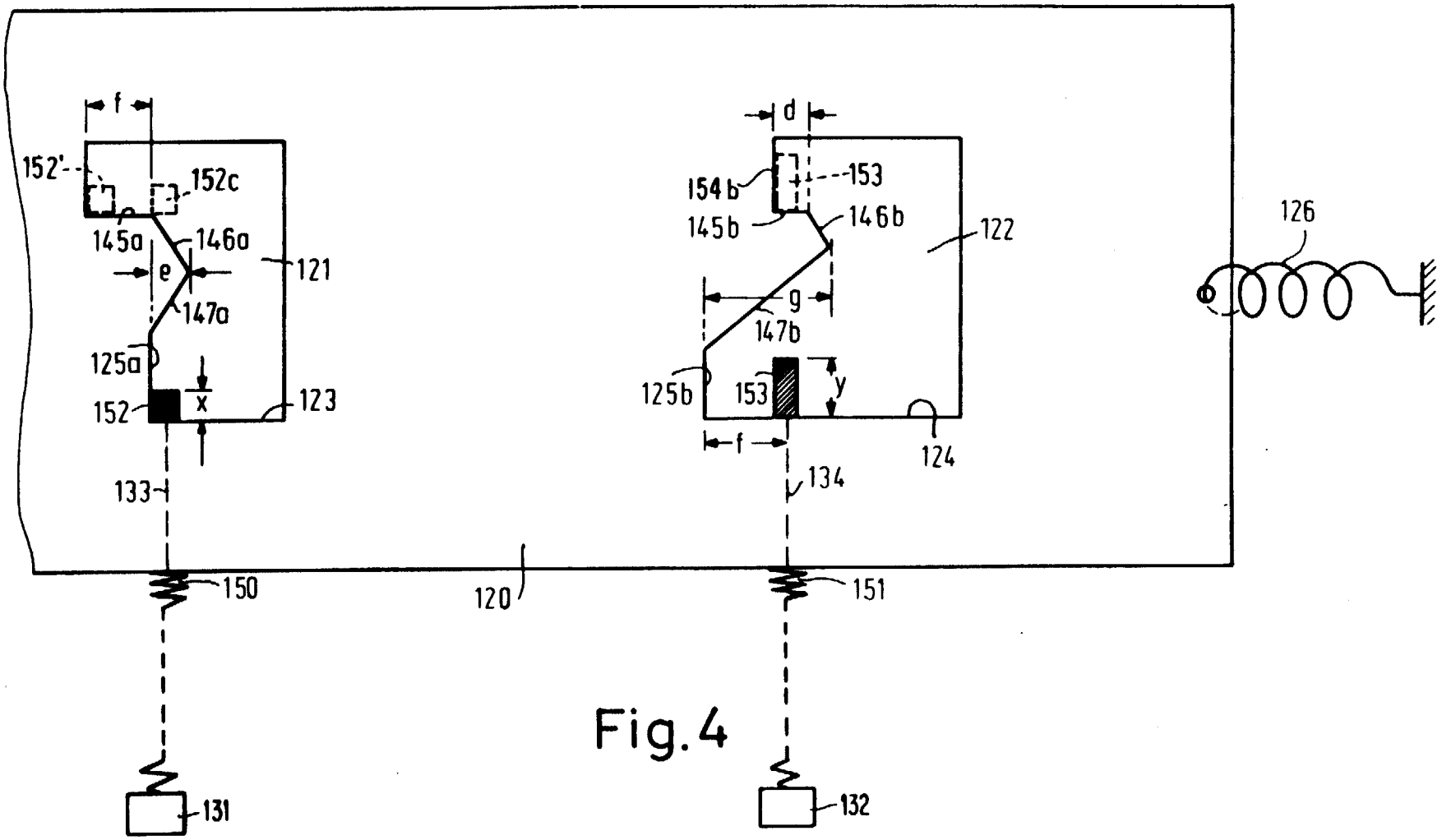
FIG. 4 is a diagrammatic representation of a latch slide in a second embodiment, having allocated latches of push-button bars.

In a modified embodiment shown in FIG. 4, the blocking member is designed as a slide 120. The push buttons 131 and 132 interact with push-button bars 133 and 134. The push-button bar 133 is provided with a latch 152, and the push-button bar 134 is provided with a latch 153. These latches 152 and 153 engage in recesses 121 and 122 of the slide 120. The latches 152 and 153, when the push-button bars 133 and 134 are in the neutral position, lie in front of the front edges 123 and 124 of the recesses 121 and 122. Springs 150 and 151 always pull the push-button bars 133 and 134 into their neutral and initial position at the edges 123 and 124 so long as they have not been arrested after they have been pushed in; while a spring 126 pulls the slide 120 toward the right.

The recesses 121 and 122 are shaped differently and, together with the latches which can be moved inside them, form different latching arrangements. Both recesses 121 and 122 are provided with blocking edges 145a and 145b which run across the press-in direction of the push-button bars 133 and 134 and behind which the latches 152 and 153 can interlock. Second sliding edges 146a and 146b running at an inclined angle to the push-in direction adjoin the blocking edges 145a and 145b. First inclined sliding edges 147a and 147b follow the second inclined sliding edges 146a and 146b in the opposite direction to the push-in direction, and enclose an obtuse angle with the inclined edges 146a and 146b respectively. Of course, it is not absolutely simply facilitate the push-in movement and therefore the ease of operation. Stop or guide surfaces 125a and 126b, which run in the push-in direction, are provided between the first inclined sliding edges 147a and 147b and the front edges 123 and 124.

If the push-button bar 133 is pushed in by pressing the push button 131, the latch 152 travels along the guide edge 125a, the first inclined sliding edge 147a and the second inclined sliding edge 146a so as to then drop behind the blocking edge 145a. At the same time, the slide 120 has moved to the left while the edge 147a is engaged, and then to the right while the edge 146a is engaged, under the biasing force of the spring 126. When the latch 152 passes behind the blocking edge 145a, the spring 126 pulls the slide 120 further to the right until the guide surface 125b contacts the latch 153. The latch 152 is now in a position, relative to the recess 121, shown as 152'. If the push-button bar 134 is now pushed in by depressing the push button 132, the latch 153 slides along the first inclined surface 147b and pulls the slide 120 to the left. During this sliding movement of the latch 153 along the first inclined sliding edge 147b, the latch 152 is released and the push-button bar 133 returns to its initial position. When the push-button bar 134 is pushed further, the latch 153 passes along the second inclined sliding edge 146b while the slide 120 is pulled to the right, to the blocking edge 145b. Further sliding of the slide 120, due to the spring 126, then interlocks latch 153 behind this blocking edge. If at this point the push-button bar 133 is pushed in again, the latch 152 pushes the slide to the left by its movement along the first inclined sliding edge 147a, so that the latch 153 is released. The precondition for this operation is that the transverse length d of the blocking edge 145b in the recess 122 is smaller than the distance e by which the inclined edge 147a in the recess 121 will move the slide 120 to the left.

[In] *If* both push-button bars 133 and 134 are pushed in, the slide can be pushed to the left only to the point where further slide movement to the right is prevented by contact of an edge 154b in the recess 122 with the latch 153. The latch 152 is then in the position 152c. This means that, when the user stops depressing the two buttons 131, 132 the latch 152 is pulled back over the sliding edge 146a by means of the spring 150. But this is also adequate to move the sliding edge 146b in front of the latch 153. The spring 151 then pulls out the push-button bar 134, and the latch 153 travels past the second inclined edge 146b. When both push-button bars 133 and 134 are pushed in and released at the same time, both push-button bars will therefore return freely into their initial positions.

For perfect functioning of the arrangement according to FIG. 4, it is also important for the displacement g of the slide 120, when the latch 153 slides along the first inclined sliding edge 147b, to be greater than the transverse length f of the blocking edge 145a.

In FIG. 4, the latches 152 and 153, in the push-in direction, are shown to be different lengths by the values x and y. These different latch lengths make it possible for the respective push-in displacement of a push-button bar always to be approximately the same up to the unlocking of another push-button bar engaged beforehand.

I claim:

[1. Apparatus comprising:

two movable control elements movable between respective neutral and operating positions, two latching mechanisms, each responsive to movement of a respective control element from its neutral to its operating position, for engaging said respective control element for latching the respective element in its operating position, said latching mechanisms being of dissimilar configuration, interlocking means for releasing the latching mechanism associated with one element responsive to movement of the other element to its respective operating position, and means, responsive to movement of both elements from their neutral to their operating positions, for disabling the latching mechanisms from latching the respective elements, thereby permitting said elements to return to their neutral positions.]

[2. An apparatus as claimed in claim 1, further comprising means for moving an article in a given direction, means for enabling said means for moving responsive to movement of one of said control elements to its operating position, and means for inhibiting said means for moving responsive to movement of both of said control elements to their respective operating positions.]

3. An apparatus [as claimed in claim 2,] *comprising:*

*two movable control elements movable between respective neutral and operating positions,*

*two latching mechanism, each responsive to movement of a respective control element from its neutral to its operating position, for engaging said respective control element for latching the respective element in its operating position, said latching mechanisms being of dissimilar configuration,*

*interlocking means for releasing the latching mechanism associated with one element responsive to movement of the other element to its respective operating position, and*

*means, responsive to movement of both elements from their neutral to their operating positions for disabling the latching mechanisms from latching the respective elements, thereby permitting said elements to return to their neutral positions,* characterized in that:

said control elements are push-button bars, movable against a biasing force in a push-in direction from their respective neutral positions, said latching mechanisms include a common spring-loaded blocking member arranged to be movable in response to movement of at least either of said control elements from its neutral position to its operating position, and a respective latch element associated with and moving together with each control element, and said blocking member is moved a first distance *in a first direction* transversely to said push-in direction, *and is then moved in a second direction opposite said first direction,* in response to depression of one only of said control elements to its operating position, and is moved a second distance different from said first distance transversely to said push-in direction in response to depression of at least the other of said control elements to its operating position.

4. An apparatus as claimed in claim 3, in which said blocking member has, for each latch element, a respective blocking edge extending transversely to said push-in direction, and a respective first sliding edge extending at an inclined angle to the push-in direction, characterized in that:

said blocking member has a respective second inclined sliding edge between each blocking edge and the respective first inclined sliding edge, arranged such that upon depression of both control elements, and simultaneous release of both control elements by a user, engagement of one latch *element* with the respective second sliding edge unlocks the latching [arrangement] *mechanism* of the other control element.

5. An apparatus as claimed in claim 4, characterized in that, during sliding movement of a latch *element* along at least one of its associated inclined sliding edges, said blocking member moves transversely to said push-in direction a distance greater than a length of the blocking edge, transversely to said push-in direction, of the other latching [arrangement] *mechanism.*

6. An apparatus as claimed in claim 4, characterized in that said first and second sliding edges of each respective [latching arrangement] *blocking member* enclose an obtuse angle with one another.

7. An apparatus as claimed in claim 6, characterized in that each of said [latches] *latch elements* is designed such that movement of the respective push-button bar is approximately a same distance up to the unlocking of another push-button bar engaged beforehand.

8. An apparatus as claimed in claim 7, characterized in that said blocking member is a displaceable slide having a respective recess formed therein in which the respective [latches] *latch elements* are movable, characterized in that said slide is displaced in both directions transversely to said push-in direction during movement of one of said push-button bars from its neutral to its operating position.

9. An apparatus [as claimed in claim 7,] *comprising:*

*two movable control elements movable between respective neutral and operating positions,*

*two latching mechanisms, each responsive to movement of a respective control element from its neutral to its operating position, for engaging said respective control element for latching the respective element in its operating position, said latching mechanisms being of dissimilar configuration,*

*interlocking means for releasing the latching mechanisms associated with one element responsive to movement of the other element to its respective operating position, and* means, responsive to movement of both elements from their neutral to their operating positions, for disabling the latching mechanisms from latching the respective elements, thereby permitting said elements to return to their neutral positions, characterized in that

*said control elements are bars, movable against a biasing force in a first direction from their respective neutral positions,*

*said latching mechanisms include a common spring-loaded blocking member arranged to be movable in response to movement of at least either of said control elements from its neutral position to its operating position, and a respective latch element associated with and moving together with each control element,*

*said blocking member is moved a first distance transversely to said first direction in response to movement of one only of said control elements to its operating position, and is moved a second distance different from said first distance transversely to said first direction in response to movement of at least the other of said control elements to its operating position, and,* said blocking member is a pivotable catch interacting with the [latches] *latch elements* of said push-button bars, and said apparatus includes means for applying a spring force tending to pivot said catch in a given direction at least while one of said control elements is moved from its neutral position, engagement of said catch by said [latches] *latch elements* pivoting the catch against said spring force.

10. An apparatus as claimed in claim 9, characterized in that said [latches] *latch elements* extend tangentially to the catch pivot axis, latches of two different latching [arrangements] *mechanisms* extending differing distances in the tangential direction.

11. An apparatus as claimed in claim 10, characterized in that said blocking member is a plastic injection molding, said means for applying comprising a flexible plastic arm formed as part of said blocking member and arranged for engagement by inclined edges formed on said push-button bars.

[12. Apparatus comprising:

two movable control elements movable in a same given direction between respective neutral and operating positions, two latching mechanisms, each responsive to movement of a respective control element from its neutral to its operating position, for engaging said respective control element for latching the respective element in its operating position, said latching mechanisms being of dissimilar configuration, interlocking means for releasing the latching mechanism associated with one element responsive to movement of the other element to its respective operating position, and means, responsive to movement of both elements from their neutral to their operating positions, for disabling the latching mechanisms from latching the respective elements, thereby permitting said elements to return to their neutral positions.]

13. An apparatus [as claimed in claim 12] *comprising:*

*two movable control elements movable in a same given direction between respective neutral and operating positions,*

*two latching mechanisms, each responsive to movement of a respective control element from its neutral to its operating position, for engaging said respective control element for latching the respective element in its operating position, said latching mechanisms being of dissimilar configuration,*

*interlocking means for releasing the latching mechanism associated with one element responsive to movement of the other element to its respective operating position, and*

*means, responsive to movement of both elements from their neutral to their operating positions, for disabling the latching mechanisms from latching the respective elements, thereby permitting said elements to return to their neutral positions,* characterized in that said latching mechanisms include a common spring-loaded blocking member arranged to be movable in response to movement of at least either of said control elements from its neutral position to its operating position, and a respective latch element associated with and moving together with each control element, and said blocking member is moved a first distance *in a first direction* transversely to said given direction, *and is then moved in a second direction opposite said first direction,* in response to depression of one only *of said control elements for unlatching the latch element of the other of said control elements;* and is moved a second distance different from said first distance transversely to said given direction in response to depression of at least the other of said control elements to its operating position.

14. An apparatus as claimed in claim 13, in which said blocking member has, for each latch element, a respective blocking edge extending transversely to said given direction, and a respective first sliding edge extending at an inclined angle to the given direction, characterized in that:

said blocking member has a respective second inclined sliding edge between each blocking edge and the respective first inclined sliding edge, arranged such that upon depression of both control elements, and simultaneous release of both control elements by a user, engagement of one latch *element* with the respective second sliding edge unlocks the latching [arrangement] *mechanism* of the other control element.

15. An apparatus as claimed in claim 14, characterized in that said blocking member is a pivotable catch interacting with the latches of said push-button bars, and said apparatus includes means for applying a spring force tending to pivot said catch in a given direction at least while one of said control elements is moved from its neutral position, engagement of said catch by said [latches] *latch mechanism* pivoting the catch against said spring force.

16. An apparatus as claimed in claim 15, characterized in that said [latches] *latch elements* extend tangentially to the catch pivot axis, [latches] *latch elements* of two different latching arrangements extending differing distances in the tangential direction.

17. An apparatus as claimed in claim 16, characterized in that said blocking member is a plastic injection molding, said means for applying comprising a flexible plastic arm formed as part of said blocking member and arranged for engagement by inclined edges formed on said push-button bars.

[18. Magnetic tape apparatus having at least two push-buttons which, when their push-button bars are pressed in separately, exercise individual functions on apparatus parts, with it being possible for each of the push-button bars, loaded in tension by means of springs in the direction of their initial neutral positions, to be arrested in the pressed-in position, and with it being possible for a spring-loaded blocking member which can be moved by all push-button bars and which interacts with latches on the push-button bars to be adjusted in such a way that, when a push-button bar is pressed in, a push-button bar arrested beforehand is released for withdrawal, the individual latches of at least two push-button bars with blocking member parts allocated to the individual latches, having latching arrangements of different design, characterized in that the push-button bars (33, 34; 133, 134) having a different latching arrangement, when they are alternately pushed in, are released by the blocking member (20, 120) for withdrawal, and that the blocking member (20, 120), when these push-button bars (33, 34; 133, 134) are pushed in together, likewise releases these two push-button bars for withdrawal.]

[19. Magnetic tape apparatus according to claim 18, with the blocking member for each latch having a blocking edge running across the push-in direction, and a first sliding edge running at an inclined angle to the push-in direction, characterized in that a second inclined sliding edge (47; 147a; 147b) is provided between the blocking edge (45; 145a, 145b) and the first inclined sliding edge, with the first inclined sliding edge (47; 147a; 147b), when a push-button bar (33; 133; 34; 134) is pushed in, and the second inclined sliding edge (46; 146a; 146b), during withdrawal, unlocking at least one other push-button bar (34; 134; 33; 133).]

[20. Magnetic tape apparatus according to claim 19, characterized in that the length (e.g) of the deflection movement of the blocking member (20, 120), during the longitudinal sliding movement of a latch (52; 152a, 152b) of a latching arrangement along one of the associated inclined sliding edges (46, 146a and b; 47, 147a and b), is always greater than the length (d; f) of the blocking edge (45, 145a and b) across the push-button bar sliding direction of the other latching arrangement.]

* * * * *